(12) United States Patent
Yi et al.

(10) Patent No.: US 10,470,139 B2
(45) Date of Patent: Nov. 5, 2019

(54) METHOD FOR ALLOCATING CELL INDEX FOR WLAN NETWORK FOR LTE-WLAN AGGREGATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 77 days.

(21) Appl. No.: 15/558,521

(22) PCT Filed: Apr. 8, 2016

(86) PCT No.: PCT/KR2016/003690
§ 371 (c)(1),
(2) Date: Sep. 14, 2017

(87) PCT Pub. No.: WO2016/171419
PCT Pub. Date: Oct. 27, 2016

(65) Prior Publication Data
US 2018/0084510 A1    Mar. 22, 2018

Related U.S. Application Data

(60) Provisional application No. 62/149,527, filed on Apr. 18, 2015.

(51) Int. Cl.
*H04W 52/36*  (2009.01)
*H04W 24/02*  (2009.01)
(Continued)

(52) U.S. Cl.
CPC ......... *H04W 52/365* (2013.01); *H04W 24/02* (2013.01); *H04W 52/0229* (2013.01);
(Continued)

(58) Field of Classification Search
CPC . H04W 52/365; H04W 76/15; H04W 72/048; H04W 52/0229; H04W 24/02;
(Continued)

(56) References Cited

U.S. PATENT DOCUMENTS

2011/0222523 A1    9/2011  Fu et al.
2012/0176923 A1*   7/2012  Hsu .................... H04W 52/243
                                                                370/252
(Continued)

FOREIGN PATENT DOCUMENTS

WO    2012047020    4/2012
WO    2012091651    7/2012
(Continued)

OTHER PUBLICATIONS

Ericsson, ST-Ericsson, Properties of a Cell Index, 3GPP TSG-RAN WG2 #70bis, Stockholm, Sweden Jun. 28-Jul. 2, 2010, R2-103617. (Year: 2010).*

(Continued)

*Primary Examiner* — Shailendra Kumar
(74) *Attorney, Agent, or Firm* — Lee Hong Degerman Kang Waimey

(57) ABSTRACT

The present invention relates to a wireless communication system. More specifically, the present invention relates to a method and a device for transmitting a power headroom reporting for LTE-WLAN aggregation system, the method comprising: configuring Long Term Evolution (LTE) network and Wireless-LAN (WLAN) network over which the UE transfers data in LTE-WLAN aggregation system; receiving a cell index used for the WLAN network from an eNB, wherein the cell index for WLAN network is currently not used for any cell of the LTE network configured for the UE; and transmitting a Medium Access Control (MAC) Control Element (CE) including information for the WLAN network with the cell index, wherein the cell index indicates that the MAC CE includes the information for the WLAN network.

10 Claims, 12 Drawing Sheets

| $C_7$ | $C_6$ | $C_5$ | $C_4$ | $C_3$ | $C_2$ | $C_1$ | R |
|---|---|---|---|---|---|---|---|
| P | V | PH (Type 2, PCell) ||||||
| R | R | $P_{CMAX,c}$ 1 ||||||
| P | V | PH (Type 1, PCell) ||||||
| R | R | $P_{CMAX,c}$ 2 ||||||
| P | V | PH (Type 1, SCell 1) ||||||
| R | R | $P_{CMAX,c}$ 3 ||||||
| ... |||||||||
| P | V | PH (Type 1, SCell 3 = WLAN) ||||||
| R | R | $P_{CMAX,W}$ ||||||
| ... |||||||||
| P | V | PH (Type 1, SCell n) ||||||
| R | R | $P_{CMAX,c}$ m ||||||

(51) Int. Cl.
  *H04W 52/02* (2009.01)
  *H04W 72/04* (2009.01)
  *H04W 76/16* (2018.01)
  *H04W 88/06* (2009.01)
  *H04W 84/12* (2009.01)
  *H04W 52/14* (2009.01)
  *H04W 52/38* (2009.01)

(52) U.S. Cl.
  CPC ......... *H04W 72/048* (2013.01); *H04W 76/16* (2018.02); *H04W 52/146* (2013.01); *H04W 52/367* (2013.01); *H04W 52/38* (2013.01); *H04W 84/12* (2013.01); *H04W 88/06* (2013.01); *Y02D 70/00* (2018.01); *Y02D 70/10* (2018.01); *Y02D 70/12* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/22* (2018.01); *Y02D 70/23* (2018.01)

(58) Field of Classification Search
  CPC . H04W 52/146; H04W 52/367; H04W 52/38; H04W 84/12; H04W 88/06; Y02D 70/1242; Y02D 70/146; Y02D 70/23; Y02D 70/1264; Y02D 70/142; Y02D 70/1224; Y02D 70/12; Y02D 70/1262; Y02D 70/126; Y02D 70/14; Y02D 70/00; Y02D 70/22; Y02D 70/10
  See application file for complete search history.

(56) References Cited

U.S. PATENT DOCUMENTS

| | | |
|---|---|---|
| 2012/0178494 A1 | 7/2012 | Haim et al. |
| 2012/0302173 A1 | 11/2012 | Bostrom et al. |
| 2013/0176953 A1 | 7/2013 | Stern-Berkowitz et al. |
| 2014/0369198 A1* | 12/2014 | Rinne ................... H04W 40/02 370/235 |
| 2015/0003345 A1 | 1/2015 | Kuo |
| 2015/0341821 A1* | 11/2015 | Hong .................... H04W 28/08 370/230 |
| 2016/0119883 A1* | 4/2016 | Lee ..................... H04W 52/146 370/329 |
| 2016/0219475 A1* | 7/2016 | Kim .......................... H04L 5/00 |
| 2016/0219477 A1* | 7/2016 | Bergstrom ............ H04W 36/14 |
| 2016/0301513 A1 | 10/2016 | He et al. |
| 2018/0048498 A1 | 2/2018 | Stern-Berkowitz et al. |
| 2018/0084510 A1 | 3/2018 | Yi et al. |
| 2019/0075001 A1 | 3/2019 | Stern-Berkowitz et al. |

FOREIGN PATENT DOCUMENTS

| | | |
|---|---|---|
| WO | 2013089526 | 6/2013 |
| WO | 2014171648 | 10/2014 |
| WO | 2014189321 | 11/2014 |
| WO | 2015005633 | 1/2015 |

OTHER PUBLICATIONS

Panasonic, Calculation of Virtual power headroom report, 3GPP TSG-RAN WG2 #71bis, Oct. 11-15, 2010, Xi'an, China, R2-105756. (Year: 2010).*
PCT International Application No. PCT/KR2016/003691, Notification of Transmittal of the International Search Report and the Written Opinion of the International Searching Authority, or Declaration dated Jul. 22, 2016, 10 pages.
PCT International Application No. PCT/KR2016/003690, Notification of Transmittal of the International Search Report and the Written Opinion of the International Searching Authority, or Declaration dated Jul. 18, 2016, 10 pages.
LG Electronics, "Consideration on MAC configuration for unlicensed spectrum", 3GPP TSG RAN WG2 Meeting #89bis, R2-151652, Apr. 2015, 3 pages.
Sony, "LAA measurements and reporting", 3GPP TSG RAN WG1 Meeting #80, R1-150433, Feb. 2015, 1 page.
European Patent Office Application Serial No. 16783353.2, Search Report dated Oct. 4, 2018, 9 pages.
U.S. Appl. No. 15/554,941, Office Action dated Nov. 16, 2018, 9 pages.
Panasonic, "Calculation of Virtual power headroom report", 3GPP TSG RAN WG2 Meeting #71bis, R2-105756, Oct. 2010, 4 pages.
U.S. Appl. No. 15/554,941, Notice of Allowance dated Mar. 28, 2019, 6 pages.

* cited by examiner

[Fig. 1]
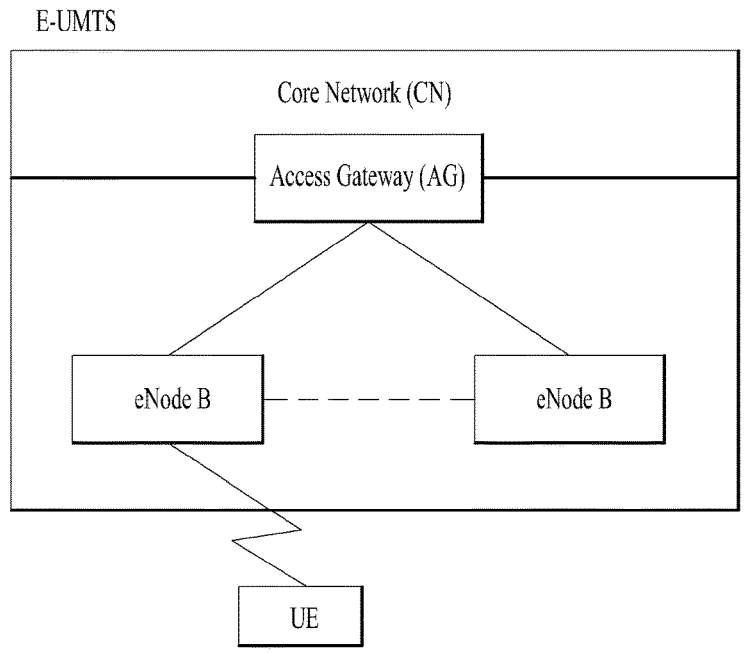
[Fig. 2A]
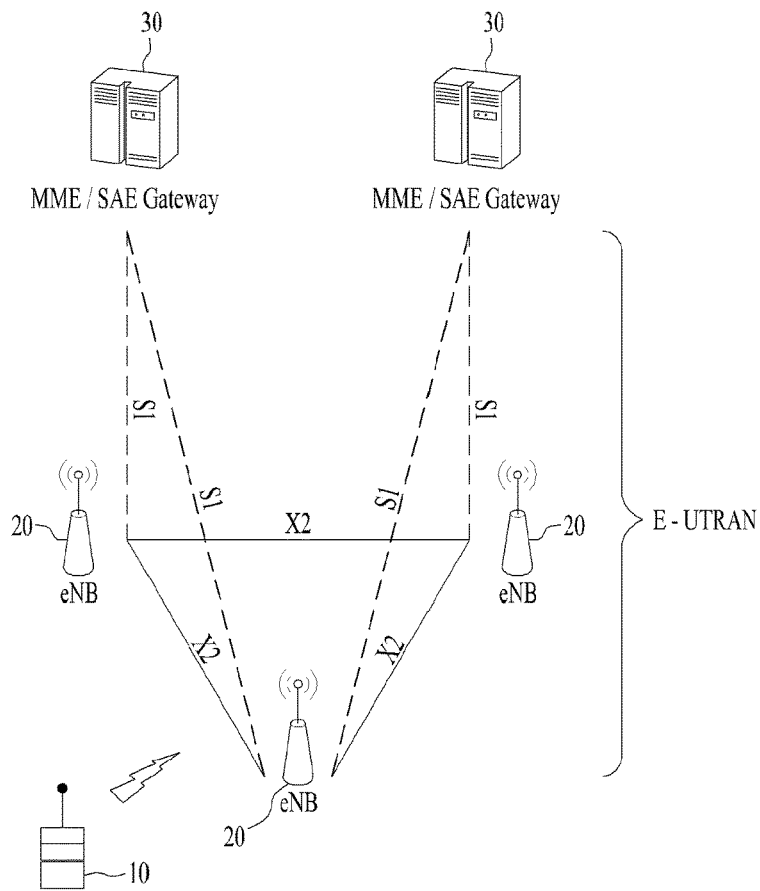

[Fig. 2B]
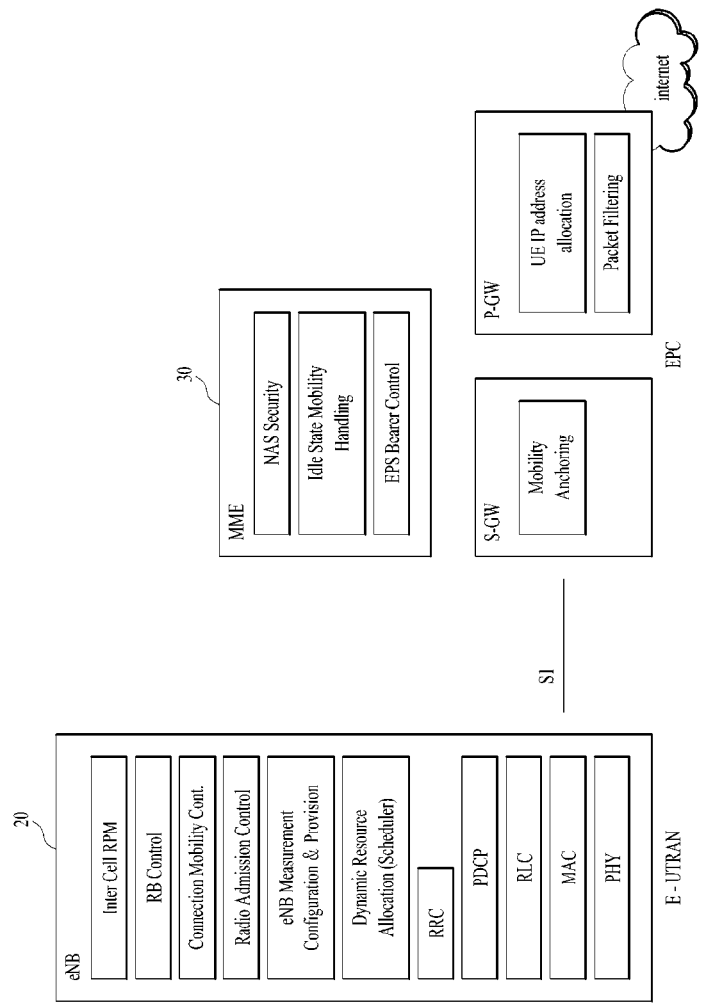

[Fig. 3]
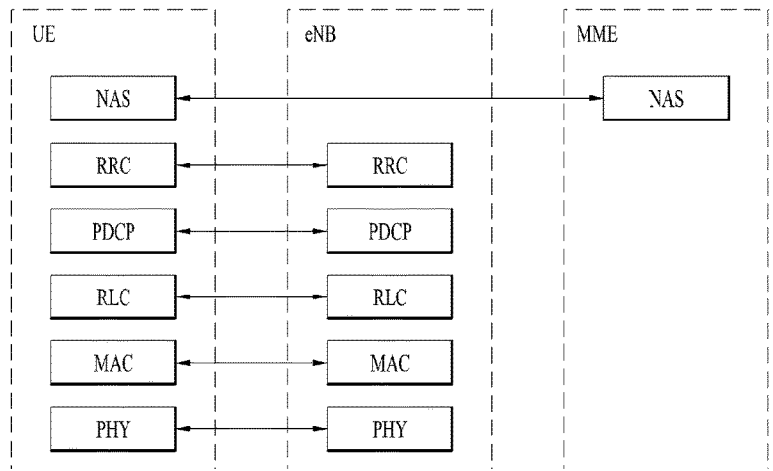
(a) Control-Plane Protocol Stack
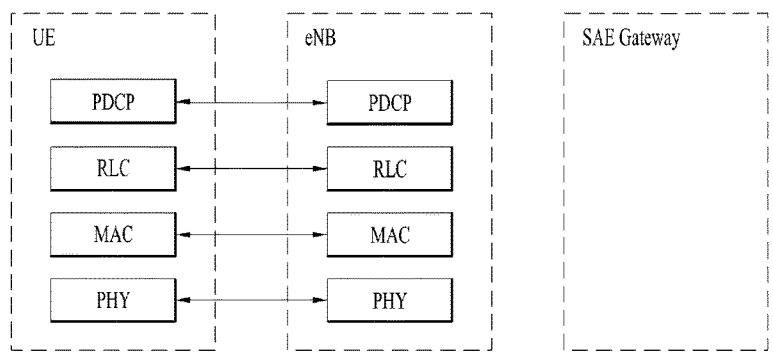
(b) User-Plane Protocol Stack
[Fig. 4]
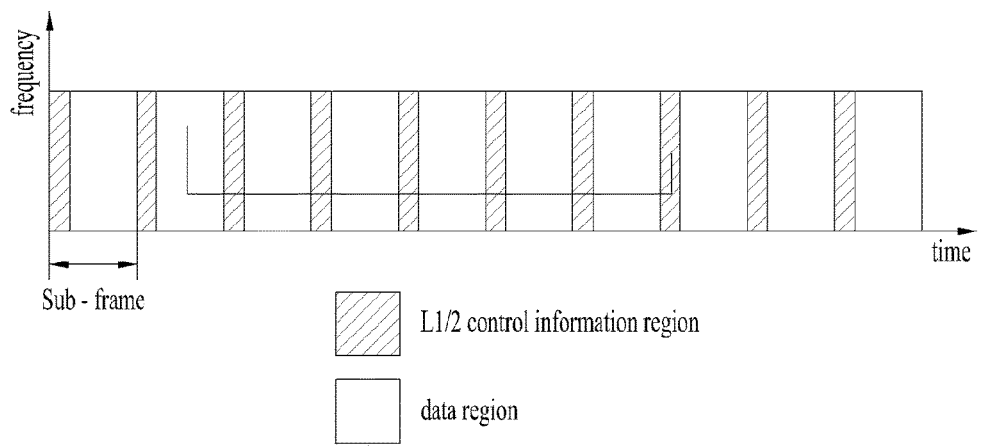

[Fig. 5]
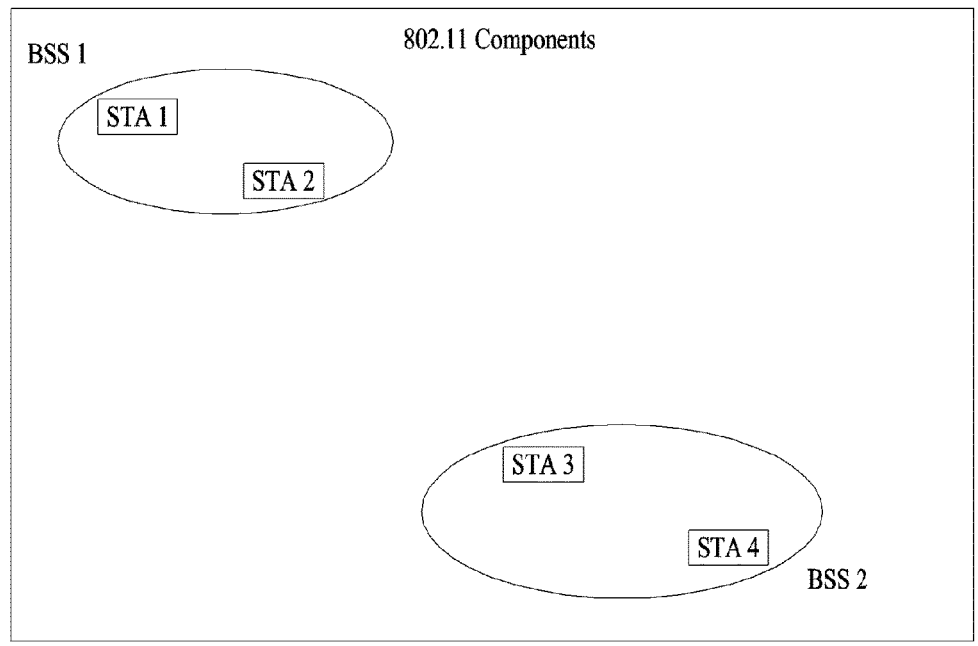
[Fig. 6]
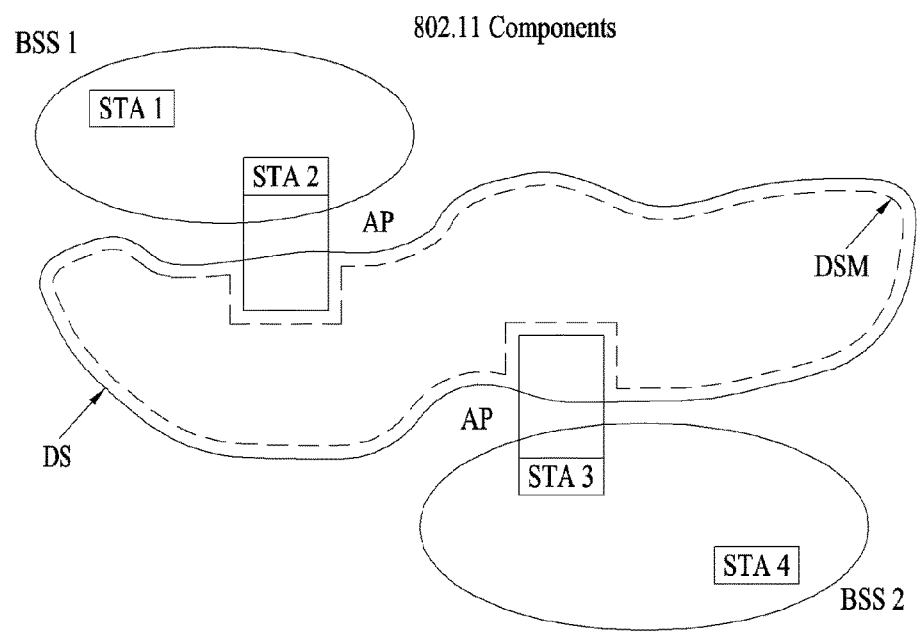

[Fig. 7]
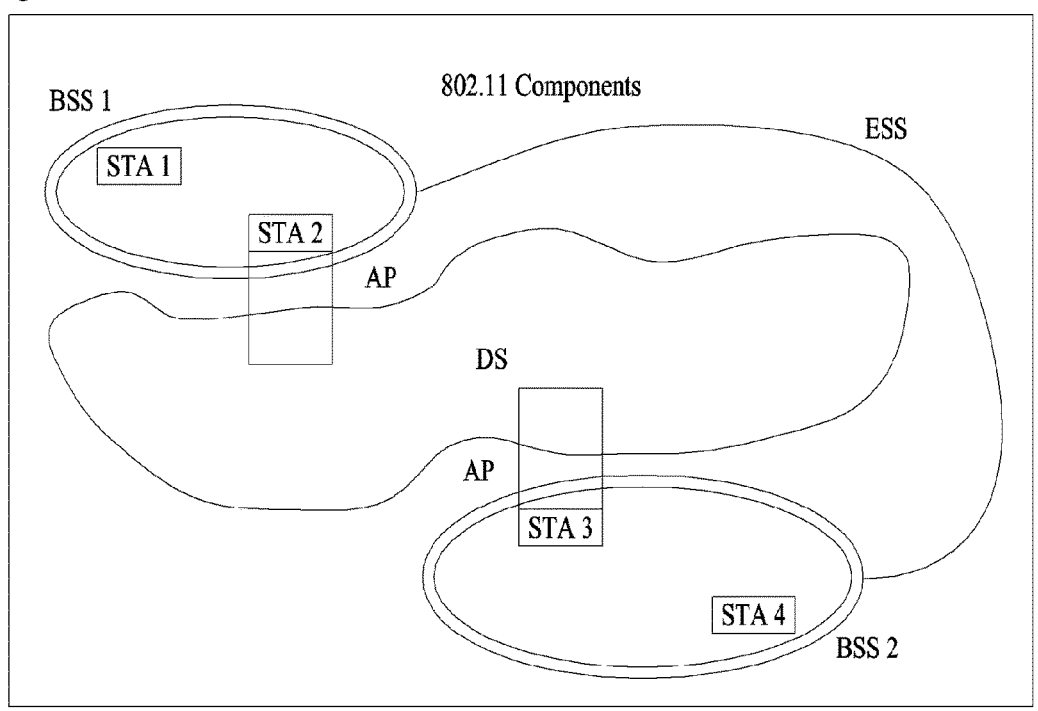

[Fig. 8]
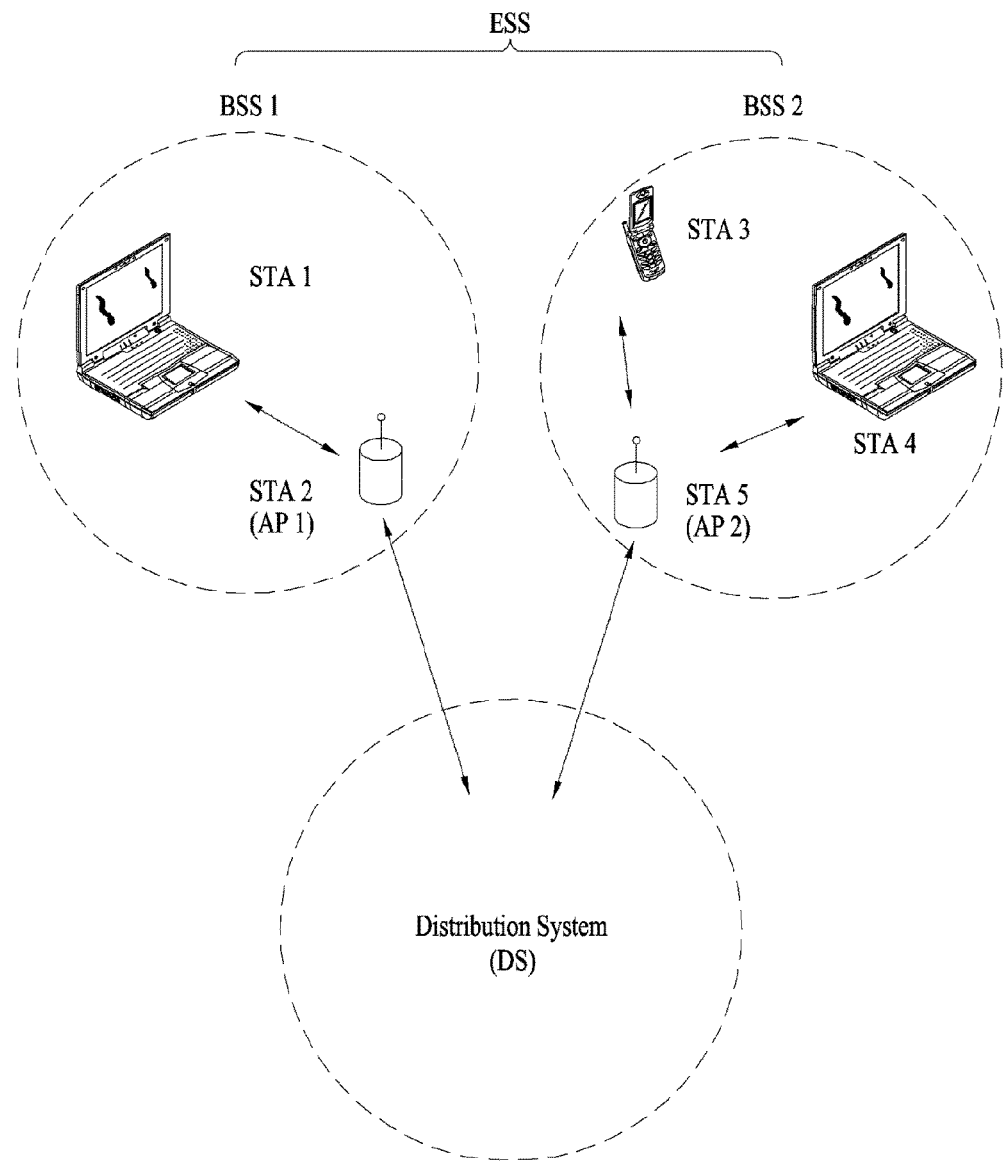

[Fig. 9]
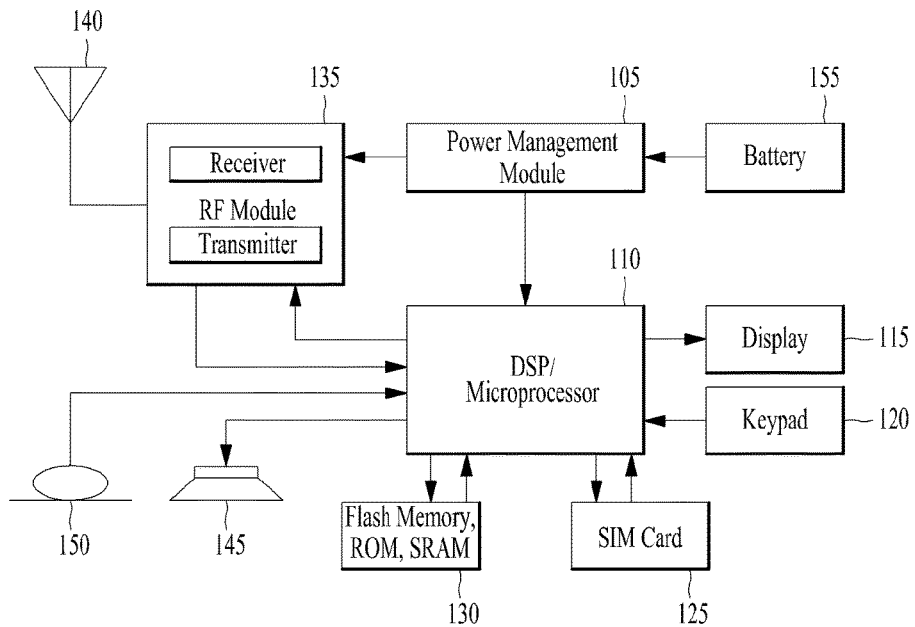
[Fig. 10]
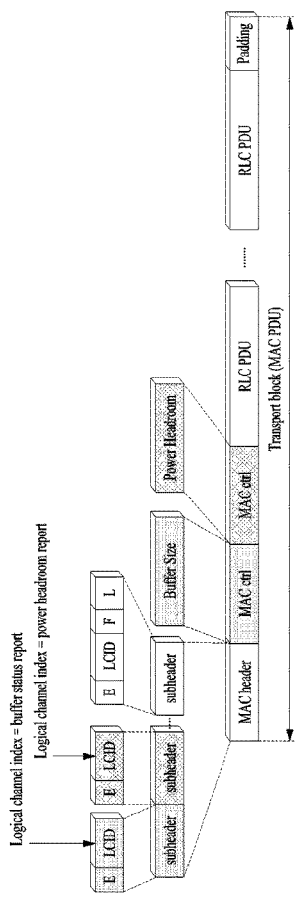

[Fig. 11A]
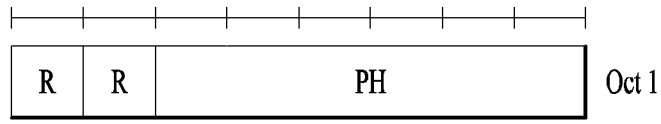
[Fig. 11B]
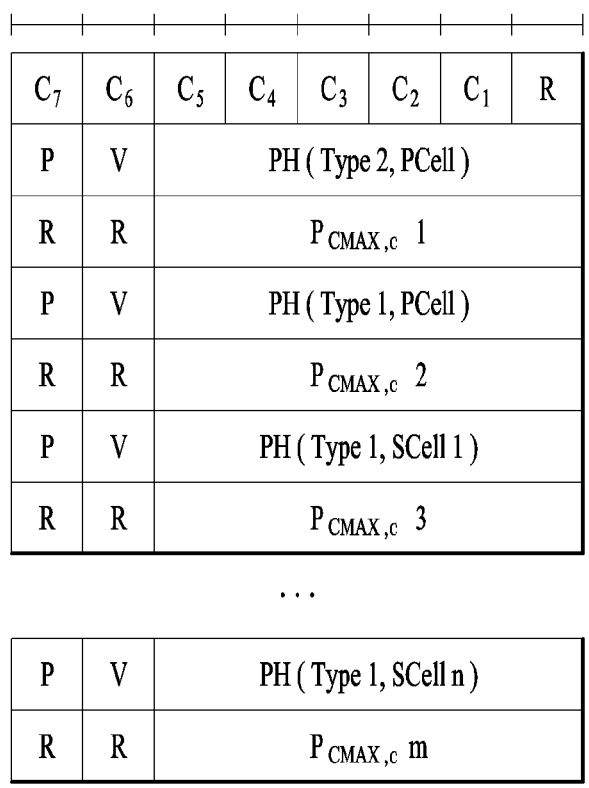

[Fig. 11C]
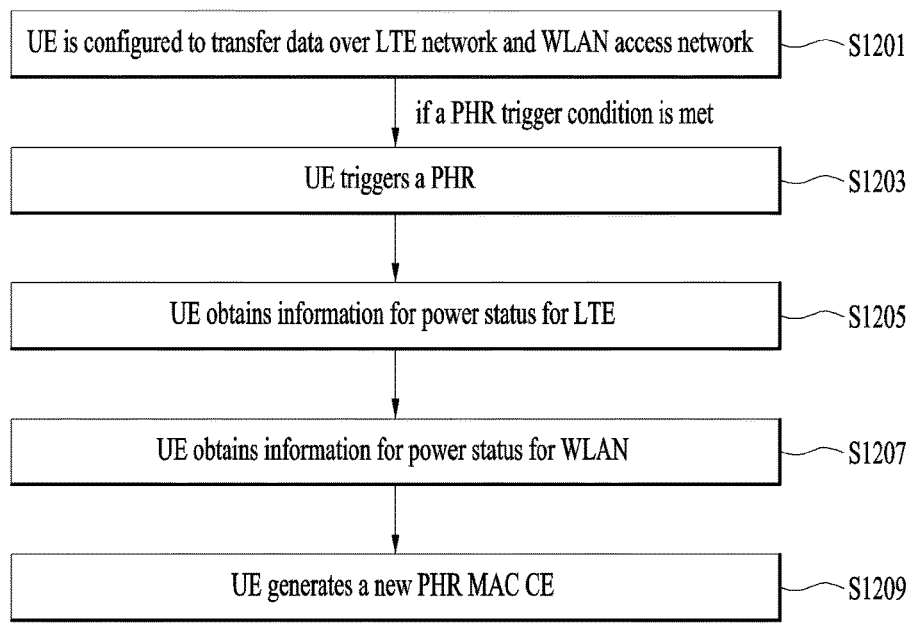
[Fig. 12]

[Fig. 13A]
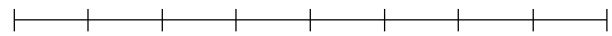

[Fig. 13B]

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH ( Type 2, PCell )} |
| R | W | \multicolumn{6}{l|}{$P_{CMAX,c}$ 1} |
| P | V | \multicolumn{6}{l|}{PH ( Type 1, PCell )} |
| R | W | \multicolumn{6}{l|}{$P_{CMAX,c}$ 2} |
| P | V | \multicolumn{6}{l|}{PH ( Type 1, SCell 1 )} |
| R | W | \multicolumn{6}{l|}{$P_{CMAX,c}$ 3} |

...

| P | V | PH ( Type 1, SCell n ) |
|---|---|---|
| R | W | $P_{CMAX,c}$ m |

[Fig. 13C]

| $C_7$ | $C_6$ | $C_5$ | $C_4$ | $C_3$ | $C_2$ | $C_1$ | W |
|---|---|---|---|---|---|---|---|
| P | V | \multicolumn{6}{l|}{PH ( Type 2, PCell )} |
| R | R | \multicolumn{6}{l|}{$P_{CMAX,c}$ 1} |
| P | V | \multicolumn{6}{l|}{PH ( Type 1, PCell )} |
| R | R | \multicolumn{6}{l|}{$P_{CMAX,c}$ 2} |
| P | V | \multicolumn{6}{l|}{PH ( Type 1, SCell 1 )} |
| R | R | \multicolumn{6}{l|}{$P_{CMAX,c}$ 3} |

...

| P | V | PH ( Type 1, SCell n ) |
|---|---|---|
| R | R | $P_{CMAX,c}$ m |
| R | R | Actual TxPower for WLAN |

[Fig. 13D]

| $C_7$ | $C_6$ | $C_5$ | $C_4$ | $C_3$ | $C_2$ | $C_1$ | W |
|---|---|---|---|---|---|---|---|
| P | V | \multicolumn{6}{c}{PH ( Type 2, PCell )} |
| R | R | \multicolumn{6}{c}{$P_{CMAX,c}$ 1} |
| P | V | \multicolumn{6}{c}{PH ( Type 1, PCell )} |
| R | R | \multicolumn{6}{c}{$P_{CMAX,c}$ 2} |
| P | V | \multicolumn{6}{c}{PH ( Type 1, SCell 1 )} |
| R | R | \multicolumn{6}{c}{$P_{CMAX,c}$ 3} |

...

| | | | | | | | |
|---|---|---|---|---|---|---|---|
| P | V | \multicolumn{6}{c}{PH ( Type 1, SCell n )} |
| R | R | \multicolumn{6}{c}{$P_{CMAX,c}$ m} |
| P | V | \multicolumn{6}{c}{PH (WLAN)} |
| R | R | \multicolumn{6}{c}{$P_{CMAX,w}$} |

METHOD FOR ALLOCATING CELL INDEX FOR WLAN NETWORK FOR LTE-WLAN AGGREGATION SYSTEM AND A DEVICE THEREFOR

CROSS-REFERENCE TO RELATED APPLICATIONS

This application is the National Stage filing under 35 U.S.C. 371 of International Application No. PCT/KR2016/003690, filed on Apr. 8, 2016, which claims the benefit of U.S. Provisional Application No. 62/149,527, filed on Apr. 18, 2015, the contents of which are all hereby incorporated by reference herein in their entirety.

TECHNICAL FIELD

The present invention relates to a wireless communication system and, more particularly, to a method for allocating cell index for WLAN network for LTE-WLAN aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Meanwhile, various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

A standard for a wireless LAN technology is developing as IEEE (Institute of Electrical and Electronics Engineers) 802.11 standard. IEEE 802.11a and b use an unlicensed band on 2.4 GHz or 5 GHz. IEEE 802.11b provides transmission speed of 11 Mbps and IEEE 802.11a provides transmission speed of 54 Mbps. IEEE 802.11g provides transmission speed of 54 Mbps in a manner of applying an OFDM (orthogonal frequency-division multiplexing) scheme on 2.4 GHz. IEEE 802.11n provides transmission speed of 300 Mbps to 4 spatial streams in a manner of applying a MIMO-OFDM (multiple input multiple output-OFDM) scheme. IEEE 802.11n supports a channel bandwidth as wide as 40 MHz. In this case, it is able to provide transmission speed of 600 Mbps.

The aforementioned wireless LAN standard has been continuously enhanced and standardization of IEEE 802.11ax, which is appearing after IEEE 802.11ac standard supporting maximum 1 Gbps by using maximum 160 MHz channel bandwidth and supporting 8 spatial streams, is under discussion.

Recently, a radio technology has been developed in two types in response to the rapid increase of traffic. Firstly, speed of the radio technology itself is getting faster. A mobile phone wireless internet technology has been developed from HSPA to LTE and LTE to LTE-A. Currently, the mobile phone wireless internet technology becomes fast as fast as maximum 225 Mbps and a Wi-Fi technology becomes fast as fast as maximum 6.7 Gbps in case of IEEE 802.11 ad. Secondly, speed can be increased using a scheme of aggregating a plurality of radio channels with each other. For example, there exists LTE-A which supports carrier aggregation corresponding to a technology of binding frequency bands using an identical radio technology into one. In this context, necessity for a technology of aggregating heterogeneous wireless internet is emerging. It is necessary to develop a scheme of transmitting data by biding radio technologies (e.g., LTE and wireless-LAN) including characteristics different from each other.

DISCLOSURE

Technical Problem

An object of the present invention devised to solve the problem lies in a method and device for allocating cell index for WLAN network for LTE-WLAN aggregation system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, when the UE receives a cell index used for the WLAN network from an eNB, the UE transmits a MAC CE including information for the WLAN network with the cell index.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIGS. 5 to 7 illustrate are exemplary configuration of an IEEE 802.11 system to which the present invention is applicable;

FIG. 8 illustrates an exemplary configuration of a WLAN system;

FIG. 9 is a block diagram of a communication apparatus according to an embodiment of the present invention;

FIG. 10 is a diagram for signaling of buffer status and power-headroom reports;

FIG. 11A is a diagram for PHR MAC CE, FIG. 11B is a diagram for Extended PHR MAC Control Element, and FIG. 11C is a diagram for Dual Connectivity PHR MAC Control Element;

FIG. 12 is a diagram for transmitting buffer status reporting according to embodiments of the present invention; and FIGS. 13A to 13D are examples for indicating that power status for data transmission over WLAN network is included or not using cell index according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings.

The embodiments of the present invention may be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc.

In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 5 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

FIG. 6 illustrates another exemplary configuration of the IEEE 802.11 system to which the present invention is applicable. In FIG. 6, components such as a Distribution System (DS), a Distribution System Medium (DSM), and an Access Point (AP) are added to the architecture illustrated in FIG. 5.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 5.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An AP is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

FIG. 7 illustrates another exemplary configuration of the IEEE 802.11 system to which the present invention is applicable. In addition to the architecture illustrated in FIG. 6, FIG. 7 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not include the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 7. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

FIG. 8 illustrates an exemplary configuration of a WLAN system. In FIG. 8, an exemplary infrastructure BSS including a DS is illustrated.

In the example of FIG. 8, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 8, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields. FIG. 9 is a block diagram of a communication apparatus according to an embodiment of the present invention.

The apparatus shown in FIG. 9 can be a user equipment (UE) and/or eNB adapted to perform the above mechanism, but it can be any apparatus for performing the same operation.

As shown in FIG. 9, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 9 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 9 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 10 is a diagram for signaling of buffer status and power-headroom reports.

UEs that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 10.

The amount of transmission power available in each terminal is also relevant for the uplink scheduler. Obviously, there is little reason to schedule a higher data rate than the available transmission power can support. In the downlink, the available power is immediately known to the scheduler as the power amplifier is located in the same node as the scheduler. For the uplink, the power availability, or power headroom (as discussed in Section 13.1.5), is defined as the difference between the nominal maximum output power and the estimated output power for UL-SCH transmission.

This quantity can be positive as well as negative (on a dB scale), where a negative value would indicate that the network has scheduled a higher data rate than the terminal can support given its current power availability. The power headroom depends on the power-control mechanism and thereby indirectly on factors such as the interference in the system and the distance to the base stations. Information about the power headroom is fed back from the terminals to the eNodeB in a similar way as the buffer-status reports—that is, only when the terminal is scheduled to transmit on the UL-SCH.

A Power Headroom Report (PHR) shall be triggered if any of the following events occur: i) prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission; ii) periodicPHR-Timer expires; iii) upon configuration or reconfiguration of the power headroom reporting functionality by upper layers, which is not used to disable the function; iv) activation of an SCell of any MAC entity with configured uplink, v) addition of the PSCell, vi) prohibit-PHR-Timer expires or has expired, when the MAC entity has UL resources for new transmission, and the following is true in this TTI for any of the activated Serving Cells of any MAC entity with configured uplink: there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell.

It is also possible to configure a prohibit timer to control the minimum time between two power-headroom reports and thereby the signaling load on the uplink.

If the MAC entity has UL resources allocated for new transmission for this TTI the MAC entity shall start periodicPHR-Timer if it is the first UL resource allocated for a new transmission since the last MAC reset. If the Power Headroom reporting procedure determines that at least one PHR has been triggered and not cancelled, the MAC entity shall obtain the value of the Type 1 power headroom from the physical layer, and instruct the Multiplexing and Assembly procedure to generate and transmit a PHR MAC control element based on the value reported by the physical layer. And the MAC entity start or restart periodicPHR-Timer, start or restart prohibitPHR-Timer, and cancel all triggered PHR.

For the uplink transmission, the UE uses the Power Headroom Reporting (PHR) in order to provide the network with information about the difference between the nominal maximum transmit power and the estimated required transmit power. Thus, PHR indicates how much transmission power can be additionally used from the UE side.

In this sense, PHR trigger events are specified in the spec, which triggers PHR when there is a power situation change in the UE side.

FIG. 11A is a diagram for PHR MAC CE. The Power Headroom Report (PHR) MAC control element is identified by a MAC PDU subheader with LCID as specified in Table 1. It has a fixed size and consists of a single octet defined as FIG. 11A.

Power Headroom (PH) field indicates the power headroom level. The length of the field is 6 bits. The reported PH and the corresponding power headroom levels are shown in Table 2 below.

TABLE 1

| Index | LCID values |
|---|---|
| 00000 | CCCH |
| 00001-01010 | Identity of the logical channel |
| 01011 | CCCH |
| 01100-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 2

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

FIG. 11B is a diagram for Extended PHR MAC Control Element. The Extended Power Headroom Report (PHR) MAC control element is identified by a MAC PDU subheader with LCID as specified in Table 1. It has a variable size and is defined in FIG. 11B. When Type 2 PH is reported, the octet containing the Type 2 PH field is included first after the octet indicating the presence of PH per SCell and followed by an octet containing the associated PCMAX,c field (if reported). Then follows in ascending order based on the ServCellIndex an octet with the Type 1 PH field and an octet with the associated PCMAX,c field (if reported), for the PCell and for each SCell indicated in the bitmap.

A Ci field indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported.

R is reserved bit, set to "0".

A V field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated PCMAX,c field, and V=1 indicates that the octet containing the associated PCMAX,c field is omitted.

A P field indicates whether the MAC entity applies power backoff due to power management (as allowed by P-MPRc). The MAC entity shall set P=1 if the corresponding PCMAX,c field would have had a different value if no power backoff due to power management had been applied.

PCMAX,c: if present, this field indicates the PCMAX,c used for calculation of the preceding PH field. The reported PCMAX,c and the corresponding nominal UE transmit power levels are shown in Table 3.

TABLE 3

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

FIG. 11C is a diagram for Dual Connectivity PHR MAC Control Element. The Dual Connectivity Power Headroom Report (PHR) MAC control element is identified by a MAC PDU subheader with LCID as specified in table 1. It has a variable size and is defined in FIG. 11C. When Type 2 PH is reported for the PCell, the octet containing the Type 2 PH field is included first after the octet indicating the presence of PH per cell (PSCell and all SCells of all MAC entities) and followed by an octet containing the associated PCMAX,c field (if reported). Then after that, when Type 2 PH is reported for the PSCell, the octet containing the Type 2 PH field is included followed by an octet containing the associated PCMAX,c field (if reported). Then follows in ascending order based on the ServCellIndex an octet with the Type 1 PH field and an octet with the associated PCMAX,c field (if reported), for the PCell and for all other serving cells of all MAC entities indicated in the bitmap.

In CA, each carrier may experience difference channel conditions; hence the PH is reported per carrier. For this, in PHR MAC CE, there is Ci field which indicates the presence of a PH field for the serving cell of any MAC entity with SCellIndex i.

In Rel-13, workitem on LTE-WLAN Radio Level Integration has started, where the UE can transfer data over WLAN access network by re-using an user plane architecture of Dual Connectivity.

From LTE point of view, WLAN access network is not a cell, so the eNB may not allocate a cell identifier such as SCellIndex or ServCellIndex to WLAN access network. Given that data transmission over WLAN access network still share UE power with data transmission over LTE, it is important to report UE power status by considering data transmission over WLAN. However, currently, the PHR MAC CE is designed to be reported per cell by indicating the cell identifier, i.e., Ci based on SCellIndex i, thus, there is no mechanism to report the UE power status by taking the WLAN into account.

FIG. 12 is a diagram for transmitting buffer status reporting according to embodiments of the present invention.

In this invention, the UE, transfer data over LTE and WLAN access network, informs the eNB of power status information for data transmission over WLAN access network. In detail, if the UE triggers a PHR, the UE transmits power status information for data transmission over WLAN access network along with power headroom for data transmission over LTE network.

The UE is configured to transfer data over LTE network and WLAN access network (S1201), i.e., for a bearer the UE transmits/receives some of the data of the bearer over LTE network while the UE transmits/receives the other data of the bearer over WLAN access network.

The UE triggers a PHR if a PHR trigger condition is met (S1203).

A Power Headroom Report (PHR) shall be triggered if any of the following events occur: i) prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission; ii) periodicPHR-Timer expires; iii) upon configuration or reconfiguration of the power headroom reporting functionality by upper layers, which is not used to disable the function; iv) activation of an SCell of any MAC entity with configured uplink, v) addition of the PSCell, vi) prohibitPHR-Timer expires or has expired, when the MAC entity has UL resources for new transmission, and the following is true in this TTI for any of the activated Serving Cells of any MAC entity with configured uplink: there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell.

If the UE triggers the PHR, the UE calculates or obtains the power headroom of a cell on which data is transferred over LTE network (S1205), and the UE calculates or obtains the power status for data transmission over WLAN access network (S1207).

Preferably, the power status for data transmission over WLAN access network is an actual transmission power with which the UE transmits data over the WLAN access network.

If there is actual transmission over WLAN access network, the difference between maximum UE transmit power over WLAN access network (Pcmax,w) and the actual transmission power over WLAN access network, i.e., Pcmax,w—actual transmission power over WLAN network.

If there is no actual transmission over WLAN access network, the difference between maximum UE transmit power over WLAN access network (Pcmax,w) and the virtual transmission power over WLAN access network, i.e., Pcmax,w—virtual transmission power over WLAN network. The virtual transmission power is calculated as if the transmission over WLAN occurs according to the predefined WLAN resource allocation in the subframe for which power status is calculated.

The UE generates a new PHR MAC CE including the information for power status for the LTE network and the information for power status for the WLAN network (S1209).

Preferably, the PHR MAC CE includes an indication that the power status for data transmission over WLAN network is included or not.

FIGS. 13A to 13D are examples for indicating that power status for data transmission over WLAN network is included or not according to embodiments of the present invention.

FIG. 13A is a case that a Ci field corresponding to a cell index i for the WLAN network in the PHR MAC CE is used as the indication.

The eNB allocates a cell identifier (ServCellIndex or SCellIndex) for WLAN access network among the cell identifiers not used for any cell of LTE network configured for the UE. The UE sets the Ci field corresponding to the cell identifier for WLAN as 1 and includes the power status for WLAN network in the fields corresponding to the Ci in the MAC CE.

In example for FIG. 13A, assume that SCellIndex 3 is allocated for WLAN network.

When the UE receives a cell index used for the WLAN network from an eNB, wherein the cell index for WLAN network is currently not used for any cell of the LTE network configured for the UE, the UE transmits a MAC CE including information for the WLAN network, wherein the cell index indicates that the MAC CE includes the information for the WLAN network.

FIG. 13B and FIG. 13D are cases that a W field in the PHR MAC CE is used as the indication.

Without allocating a cell identifier for WLAN access network, the UE includes the indication in W field which indicates that the corresponding octet with power headroom and the corresponding octet with Pcmax,w field are for power status of WLAN network.

Regarding FIG. 13B, the W field indicates whether the P/V/PH/Pcmax field is for WLAN or LTE. W field is set to 1 if the corresponding fields of P/V/PH/Pcmax,w are for power status of WLAN. In case the power status for WLAN is included, the corresponding Ci field is set to 1. W field is set to 0 if the corresponding fields are not for WLAN but for LTE. In this case, Ci field is set based on the presence of a PH field for the SCell with SCellIndex i.

Regarding FIG. 13C and FIG. 13D, the W field indicates whether the power status is included or not. The W field is set to 1 if one or two octets is included for the power status of WLAN network, e.g., at the last octet of the PHR MAC CE.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a User Equipment (UE) operating in a wireless communication system, the method comprising:
configuring Long Term Evolution (LTE) network and Wireless-LAN (WLAN) network over which the UE transfers data in LTE-WLAN aggregation system;
receiving a cell index used for the WLAN network from an eNB, wherein the cell index for WLAN network is currently not used for any cell of the LTE network configured for the UE; and
transmitting a Power Headroom Reporting (PHR) Medium Access Control (MAC) Control Element (CE) including information for the WLAN network with the cell index,
wherein the cell index indicates that the PHR MAC CE includes the information for the WLAN network, and
wherein, when the UE sets a value of a Ci field corresponding to the cell index for the WLAN network to 1, the PHR MAC CE includes power status information for the WLAN network in fields corresponding to the Ci field.

2. The method according to claim 1, wherein the information for the WLAN network is information of power status for data transmission over WLAN network.

3. The method according to claim 1, wherein the power status information for the WLAN network is an actual transmission power with which the UE transmits data over the WLAN network.

4. The method according to claim 3, wherein if there is the actual transmission over the WLAN network, the power status for data transmission over the WLAN network is a difference between maximum transmit power over WLAN network and the actual transmission power over WLAN network, and
if there is not the actual transmission over WLAN network, the power status for data transmission over WLAN network is a difference between maximum transmit power over WLAN network and a virtual transmission power over WLAN network.

5. The method according to claim 4, wherein the virtual transmission power over WLAN access network is calculated as if a transmission over WLAN occurs according to the pre-defined WLAN resource allocation in a subframe for which power status is calculated.

6. A User Equipment (UE) operating in a wireless communication system, the UE comprising:
a Radio Frequency (RF) module; and
a processor configured to:
control the RF module,
configure Long Term Evolution (LTE) network and Wireless-LAN (WLAN) network over which the UE transfers data in LTE-WLAN aggregation system,
receive a cell index used for the WLAN network from an eNB, wherein the cell index for WLAN network is currently not used for any cell of the LTE network configured for the UE, and
transmit a Power Headroom Reporting (PHR) Medium Access Control (MAC) Control Element (CE) including information for the WLAN network with the cell index,
wherein the cell index indicates that the PHR MAC CE includes the information for the WLAN network, and
wherein, when the UE sets a value of a Ci field corresponding to the cell index for the WLAN network to 1, the PHR MAC CE includes power status information for the WLAN network in fields corresponding to the Ci field.

7. The UE according to claim 6, wherein the information for the WLAN network is information of power status for data transmission over WLAN network.

8. The UE according to claim 7, wherein the power status information for the WLAN network is an actual transmission power with which the UE transmits data over the WLAN network.

9. The UE according to claim 8, wherein if there is the actual transmission over the WLAN network, the power status for data transmission over the WLAN network is a difference between maximum transmit power over WLAN network and the actual transmission power over WLAN network, and
if there is not the actual transmission over WLAN network, the power status for data transmission over WLAN network is a difference between maximum transmit power over WLAN network and a virtual transmission power over WLAN network.

10. The UE according to claim 9, wherein the virtual transmission power over WLAN access network is calculated as if a transmission over WLAN occurs according to the pre-defined WLAN resource allocation in a subframe for which power status is calculated.

* * * * *